United States Patent
Pagliarini et al.

(10) Patent No.: US 9,144,932 B2
(45) Date of Patent: Sep. 29, 2015

(54) DEVICE FOR MOULDING A RECEPTACLE OBTAINED FROM A PARISON OF PLASTIC MATERIAL, A MOULDING METHOD AND A MOULDING MACHINE

(75) Inventors: Paolo Pagliarini, Parma (IT); Matteo Di Prinzio, Guardiagrele (IT); Roberto Delmonte, Alseno (IT)

(73) Assignee: GEA PROCOMAC S.P.A., Sala Baganza (IT)

( * ) Notice: Subject to any disclaimer, the term of this patent is extended or adjusted under 35 U.S.C. 154(b) by 339 days.

(21) Appl. No.: 13/575,261

(22) PCT Filed: May 30, 2011

(86) PCT No.: PCT/IB2011/052370
§ 371 (c)(1),
(2), (4) Date: Jul. 25, 2012

(87) PCT Pub. No.: WO2011/154868
PCT Pub. Date: Dec. 15, 2011

(65) Prior Publication Data
US 2013/0069285 A1    Mar. 21, 2013

(30) Foreign Application Priority Data

Jun. 11, 2010    (IT) .............................. PR2010A0054

(51) Int. Cl.
| | | |
|---|---|---|
| *B29C 49/12* | (2006.01) | |
| *B29C 49/42* | (2006.01) | |
| *B29C 49/46* | (2006.01) | |
| B29C 33/26 | (2006.01) | |
| B29C 49/58 | (2006.01) | |
| B29C 49/78 | (2006.01) | |

(52) U.S. Cl.
CPC .............. *B29C 49/4268* (2013.01); *B29C 49/12* (2013.01); *B29C 49/46* (2013.01); *B29C 33/26* (2013.01); *B29C 49/58* (2013.01); *B29C 49/78* (2013.01)

(58) Field of Classification Search
CPC ............ B29C 49/4252; B29C 49/4268; B29C 2049/4673
USPC ......................................................... 425/529
See application file for complete search history.

(56) References Cited

U.S. PATENT DOCUMENTS 6,562,281 B1    5/2003    Marchau et al.
6,565,791 B1 *  5/2003    Laurent ......................... 264/455
(Continued)

FOREIGN PATENT DOCUMENTS

DE    10 2007 017938 A1    10/2008
DE    10 2007 050582 A1    4/2009
(Continued)

OTHER PUBLICATIONS

Partial machine translation of DE 102007050582 A1 printed Apr. 2009.*

*Primary Examiner* — Robert B Davis
(74) *Attorney, Agent, or Firm* — Pearne & Gordon LLP

(57) ABSTRACT

Method for molding a receptacle (2) starting from a parison (3) of plastic material, comprising the steps of: positioning the parison (3) inside a mold (5); progressively introducing a stretching rod (8) into the parison (3) until it reaches a bottom thereof; injecting pressurized air into the parison (3), passing radiation through the stretching rod (8), in order to sterilize the inner walls of the parison (3).

9 Claims, 5 Drawing Sheets

(56) References Cited

U.S. PATENT DOCUMENTS

| | | | |
|---|---|---|---|
| 8,696,956 B2* | 4/2014 | Winzinger et al. | 264/39 |
| 2008/0073549 A1* | 3/2008 | Avnery | 250/397 |
| 2009/0045350 A1* | 2/2009 | Humele et al. | 250/455.11 |
| 2009/0081326 A1 | 3/2009 | Adriansens et al. | |
| 2010/0054987 A1 | 3/2010 | Krueger et al. | |
| 2010/0089009 A1 | 4/2010 | Till | |
| 2011/0012032 A1* | 1/2011 | Bufano et al. | 250/492.3 |
| 2012/0294760 A1* | 11/2012 | Humele et al. | 422/22 |
| 2014/0015171 A1* | 1/2014 | Herold et al. | 264/483 |
| 2014/0265039 A1* | 9/2014 | Bellec et al. | 264/405 |

FOREIGN PATENT DOCUMENTS

| | | |
|---|---|---|
| EP | 0 996 530 A1 | 5/2000 |
| EP | 1 837 037 A1 | 9/2007 |
| EP | 1 896 329 | 3/2008 |
| EP | 2 146 838 | 1/2010 |
| EP | 2 161 202 A1 | 3/2010 |
| FR | 2 815 542 A1 | 4/2002 |
| WO | 99/03667 A1 | 1/1999 |
| WO | 2006/136498 A1 | 12/2006 |
| WO | 2008/125216 A2 | 10/2008 |
| WO | 2009/052800 A1 | 4/2009 |

* cited by examiner

DEVICE FOR MOULDING A RECEPTACLE OBTAINED FROM A PARISON OF PLASTIC MATERIAL, A MOULDING METHOD AND A MOULDING MACHINE

TECHNICAL FIELD AND BACKGROUND ART

The present invention relates to a device for moulding a receptacle obtained from a parison made of a plastic material, a method for moulding the receptacle and a moulding machine, in particular for stretch-blowing.

To fully understand the importance of the invention disclosed herein, it is advantageous to explain what is intended by forming receptacles by means of stretch-blowing.

As is known, a moulding machine comprises a plurality of moulding stations at which previously-heated parisons made of a plastic material arrive. Each moulding station includes a mould constituted by two half-portions or half-moulds relatively mobile with respect to one another. For example, the mould can be linear, so that the two half-moulds are mobile by translation, or can be a "crocodile" or "wallet" type, where the two half-moulds are hinged to one another at one of the two ends.

When the parison reaches the corresponding moulding station, the half-moulds come closer to one another in such a way as to enclose the parison. As well as the half-moulds there is usually also a profiling element of the bottom of the receptacle, commonly known in the sector as the "bottom". The bottom is arranged in one of the two bases of the mould, such as to be able to be engaged by the half-moulds during a nearing movement thereof. Moulding by stretch-blowing is done by progressively introducing a stretching rod internally of the parison, as well as a nozzle suitable for blowing pressurised air internally of the parison. In particular, first the step of pre-blowing is performed, in which the parison is lengthened by bringing the stretching rod to its end run, and the nozzle injects air at a pressure of about 6-8 bar. There follows a step of full-scale blowing, during which the nozzle injects air at a pressure of about 40 bar into the parison.

In an aseptic bottling line there exists a need to sterilise the moulded receptacles before filling them, or to sterilise the parisons before moulding them.

In particular, document EP1837037, in the name of the applicant, disclosed an apparatus and a method for sterilising receptacles after the moulding step and before the filling step. However, the sterilisation of the parisons is preferable, instead of sterilising the moulded containers, as the moulded containers have a larger surface, thus requiring longer treatment times and, in the case of chemical sterilising, greater expenditure of sterilising substances (for example hydrogen peroxide or peracetic acid).

In this context, a solution is disclosed in document EP996530 in which the parisons are sterilised by means of a sterilising product, for example hydrogen peroxide, activatable by heat.

However, this solution poses the problem of eliminating chemical residues deriving from the sterilisation, and also has the effect of lengthening process times.

Further, this solution requires a guarantee of sterility of the heating unit and handling of the parisons.

A further solution, disclosed in document EP1896329, comprises displacement of the chemical sterilisation step of the parisons after the heating thereof. However, this solution too brings with it the disadvantages of the use of sterilising chemical agents.

There also exists the possibility of using radiation sources for performing the sterilisation, as described in document EP2146838. With respect to chemical sterilisation, sterilising by radiation has the advantage of reducing operating costs due to consumption of chemical agents, resolves the problem of elimination of the chemical residues, and enables eco-sustainable plants to be realised. However, the above solution includes sterilising the parisons before heating them, so the overall process times are still long. A further advantage is connected to the need to predispose suitable screening for the radiations emitted such that they do not damage the other zones of the plant and do not constitute a risk for the operators working on control and maintenance of the machines.

In this context, the technical task underlying the present invention is to provide a moulding device for a receptacle obtained by a parison made of plastic material, a moulding method and a moulding machine, which obviate the drawbacks of the above-cited prior art.

DISCLOSURE OF THE INVENTION

In particular, it is an object of the present invention to provide a moulding device of a receptacle obtained from a parison made of plastic material and a moulding machine, capable of also performing sterilisation of the parison, while maintaining the compactness and structural complexity.

It is another object of the present invention to provide a moulding method of a receptacle starting from a parison made of plastic material, which comprises a step of sterilising the parisons while avoiding an increase in overall working times.

The stated technical task and the set objects are substantially attained by a moulding device of a receptacle obtained from a parison made of a plastic material, a moulding method and a moulding machine, comprising the technical characteristics set out in one or more of the accompanying claims.

BRIEF DESCRIPTION OF DRAWINGS

Further characteristics and advantages of the present invention will become more apparent from the following indicative, and thus non-limiting, description of a preferred but not exclusive embodiment of a moulding device of a receptacle obtained from a parison made of plastic material, a moulding method and a moulding machine, as illustrated in the appended drawings, in which.

BEST MODE FOR CARRYING OUT THE INVENTION

Figure 1:
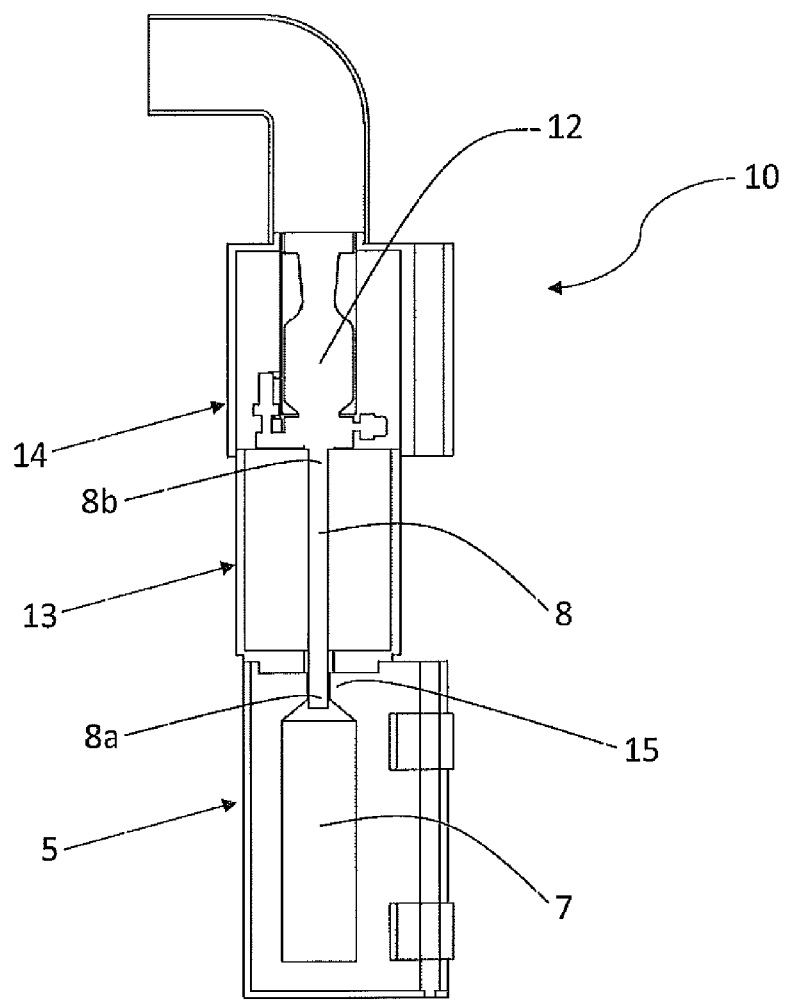
FIG. 1 illustrates a moulding device of a receptacle obtained from a parison, according to the present invention, in a section view.
Figure 2:
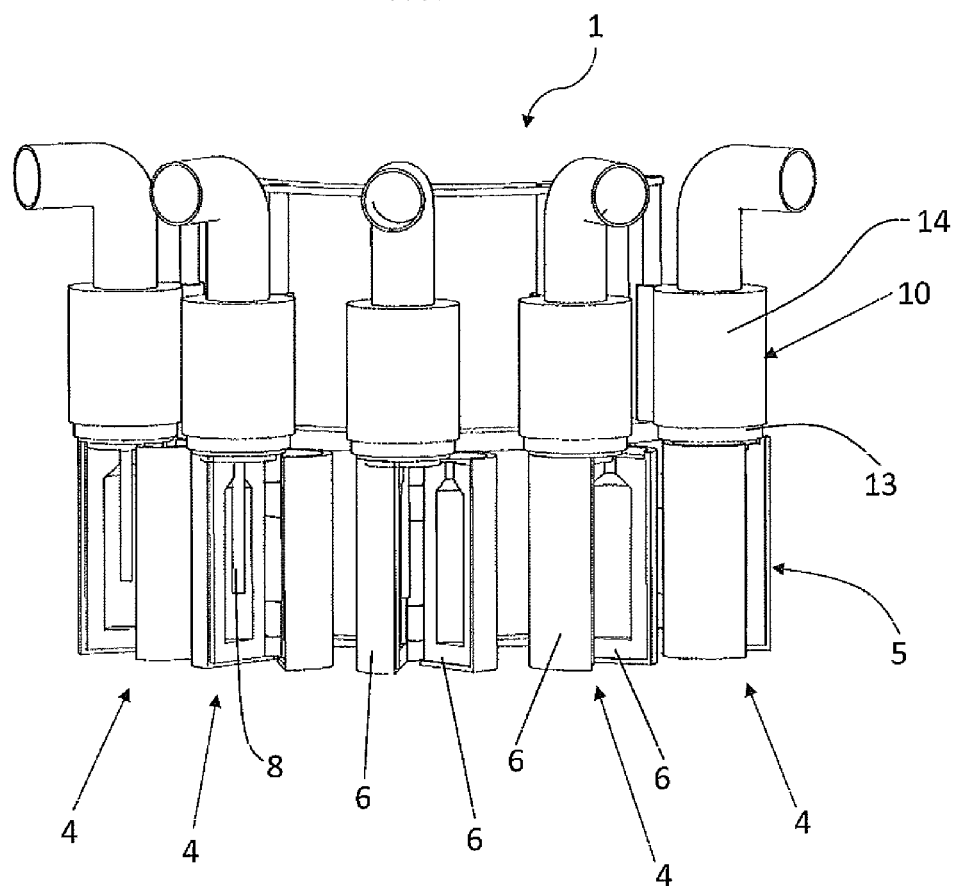
FIG. 2 illustrates a part of a moulding machine of receptacles starting from parisons made of a plastic material, according to the present invention, in a perspective view.
Figure 3:
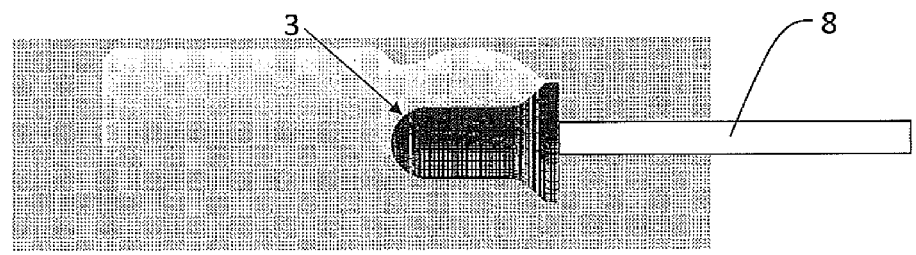
FIGS. 3 to 5 illustrate the parison and a part of the device (stretching rod) of FIG. 1, in three steps of the moulding method, in a lateral view.
Figure 4:
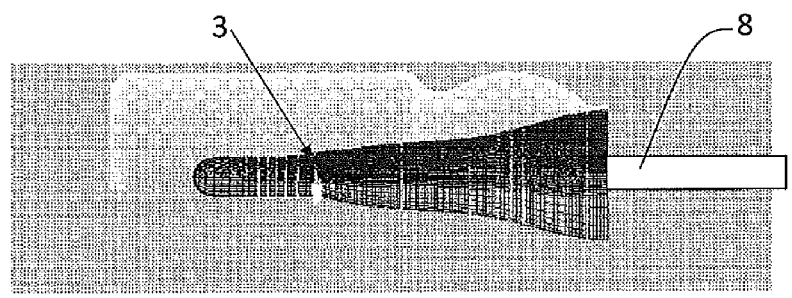
Figure 5:
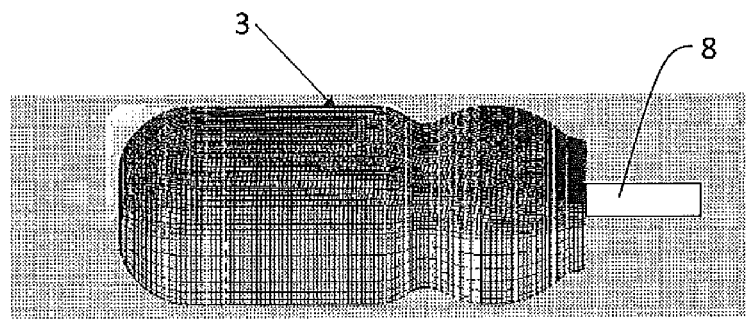
Figure 6:
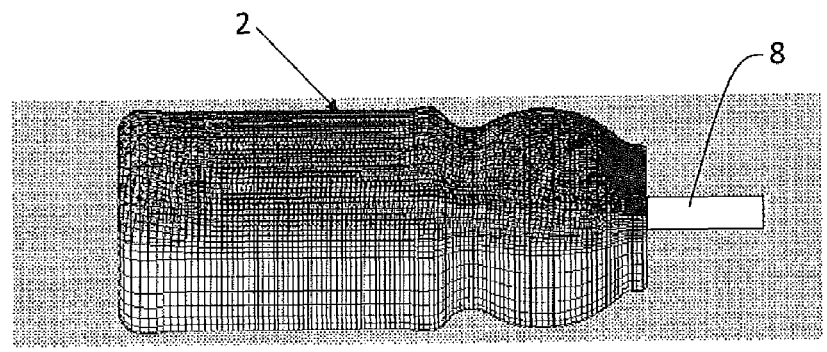
FIG. 6 illustrates the moulded receptacle.

With reference to the figures, 1 denotes a moulding machine of receptacles 2 starting from parisons 3 made of a plastic material. In particular, each parison 3 is constituted by a central tubular body and a mouth, the mouth not being subject to any moulding process.

The moulding machine 1 comprises a plurality of moulding stations 4, to each of which a moulding device 10 is associated. In the embodiment described and illustrated herein, the moulding machine 1 is a rotating carousel. Alternatively the moulding machine 1 is linear.

The moulding device 10 comprises a mould 5 destined to assume at least an operative configuration in which it surrounds and engages the parison 3. The mould 5 is constituted by two half-portions 6 that are mobile with respect to one another between a closed position in which the mould 5 is in the operative configuration, and an open position in which the mould 5 is in a rest configuration, corresponding to disengagement of the moulded receptacle 2. In particular, when the mould 5 is in the operative configuration, the two half-portions 6 are neared to one another such as to define a housing cavity 7 for the parison 3. Viceversa, when the mould 5 is in the rest configuration, the two half-portions 6 are distanced from one another such as to enable disengagement of the moulded receptacle 2. In the embodiment described and illustrated herein, the mould 5 is of the "wallet" type, i.e. the half-portions 6 are hinged at a common hinge axis and are both mobile in rotation about the common axis. Alternatively, the mould 5 is of the "crocodile" type, or linear.

The moulding device 10 is provided with a stretching rod which is progressively insertable in the parison 3 such as to stretch it.

Figure 7:
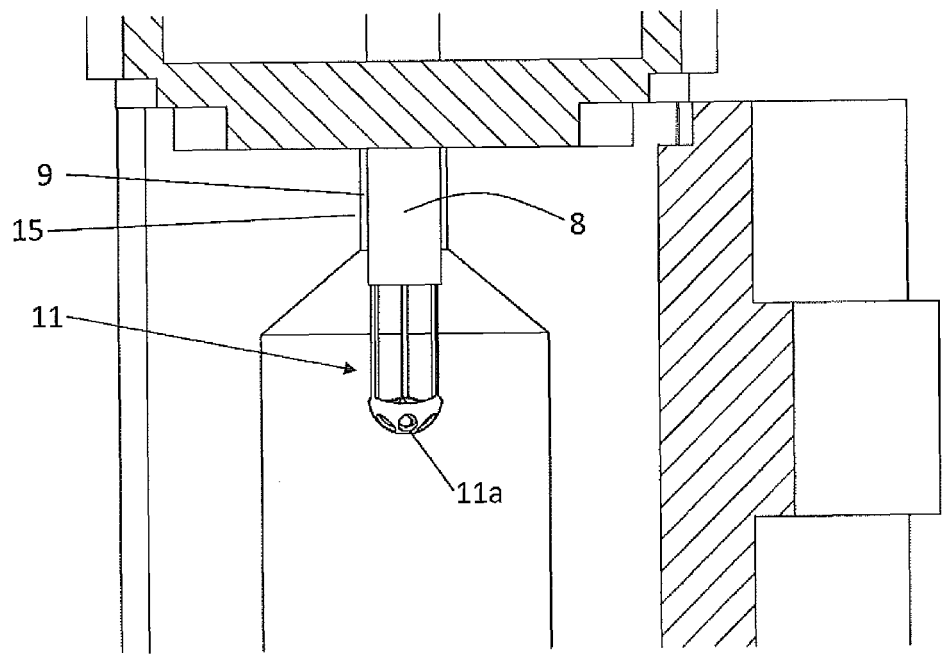
FIGS. 7 and 8 illustrate a detail of the device of FIG. 1, respectively in a partly-sectioned frontal view and in an internal perspective view from below.
Figure 8:
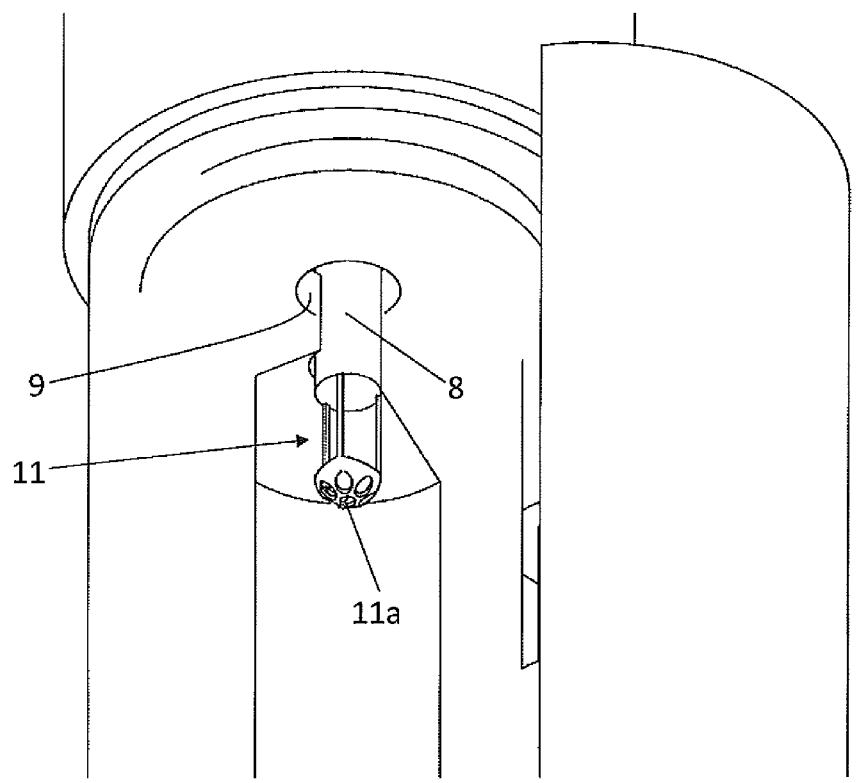

The moulding device 10 comprises a seal 15 applicable to the mouth of the parison 3. As can be seen in FIGS. 7 and 8, the stretching rod 8 crosses the seal 15 and defines therewith an annular cavity 9 for the passage of pressurised air to be injected into the parison 3. The stretching rod 8 bears a nozzle 11 at a first end 8a thereof facing towards the parison 3. In the embodiment described and illustrated herein, the nozzle 11 comprises a punched dome 11a.

The moulding device 10 originally comprises at least a radiation generator 12 suitable for emitting radiations internally of the stretching rod 8. In particular, the radiation generator 12 is arranged at a second end 8b of the stretching rod 8. The radiations cross the stretching rod 8 and when the mould 5 is in the operative configuration, the radiations exit from the nozzle 11 and enter the parison 3, striking the internal walls thereof such as to sterilise them.

The radiation generator 12 is an emitter of directly-ionising radiations (such as, for example, electrons) or indirectly ionising radiations, such as X-rays, or it is an emitter of non-ionising radiations, such as for example infrared rays, ultraviolet rays or visible light. The radiation generator 12 preferably emits accelerated electrons.

The moulding device 10 is provided with shielding means of the radiations emitted by the generator 12. In particular, the screening means include at least a first shielding element 13 which is integral to the mould 5 and a second shielding element 14 which is integral to the stretching rod 8. The first shielding element 13 is fixed, while the second shielding element 14 is mobile as it follows the movement of the stretching rod 8 in inlet and in outlet from the parison 3. The first shielding element 13 is preferably constituted by a first hollow cylinder internally of which the stretching rod 8 moves, while the second shielding element 14 is constituted by a second hollow cylinder which is slidable on the external lateral surface of the first hollow cylinder. The half-portions 6 of the mould 5 are advantageously part of the shielding means.

The moulding method of a receptacle starting from a parison of plastic material according to the present invention is described in the following.

Firstly the mould 5 is in the rest configuration, i.e. the two half-portions 6 are in the open position such as to accommodate the previously-heated parison 3. Once the parison 3 is positioned in the mould 5, the two half-portions 6 are reciprocally neared and brought into the closed position, such that the mould 5 moves into the operative configuration. At this point, the stretching rod 8 is progressively introduced internally of the parison 3 up to reaching the bottom thereof. At the same time air is injected into the annular cavity 9 defined by the seal 15 and the stretching rod 8; the air then reaches the internal walls of the parison 3. After about 0.05 seconds the pre-blowing starts, and the air pressure is increased up to reaching values of between 6 bar and 8 bar. The pre-blowing lasts about 0.1 seconds. After this, the pressure of the air is increased again up to reaching about 40 bar such that the moulding of the receptacle 2 is completed (by blowing). The blowing lasts for about 1.8 seconds.

Originally the radiations emitted by the radiation generator 12 cross the stretching rod 8 and the nozzle 11 and enter the parison 3 in such a way as to sterilise it. The emission of radiations can advantageously be interrupted in some steps of the moulding process. The passage of radiations through the nozzle 11 is preferably done at the same time as the progressive introduction of the stretching rod 8 into the parison 3. The passage of radiations through the nozzle 11 occurs during the pre-blowing, i.e. while the pressure is brought to values comprised between 6 bar and 8 bar. The passage of radiations is preferably interrupted before the full-forming blowing, i.e. on reaching about 40 bar of air pressure. When the receptacle 2 is finally moulded, the compressed air is discharged and the stretching rod 8 is progressively extracted from the moulded receptacle 2. The passage of radiations through the nozzle 11 recommences in the presence of a pressure of below 2 bar internally of the moulded receptacle 2.

On concluding the moulding process, the half-portions 6 are distanced from one another and the moulded receptacle 2 can be disengaged and will be sent on to a filling station (not illustrated).

From the above description the characteristics of the moulding device of a receptacle obtained from a parison of plastic material, the moulding method and the moulding machine, according to the present invention, can be clearly understood, as well as the advantages of the invention.

In particular, thanks to the fact that the moulding device comprises a radiation generator and the radiations are channeled into the stretching rod and the nozzle, the parison is sterilised internally of the mould. Thus the half-portions shield the radiations emitted by the nozzle. In this way, the sterilisation avoids the need to predispose additional structural components, in fact, only the stretching rod, the nozzle and the mould are used.

Further, the superposing of the sterilising step on the pre-blowing step avoids increase in process times.

Further, the proposed moulding method is extremely versatile in accordance with the parameters of the blowing cycle. For example, since during blowing the emission of radiations is practically ineffective (given the high pressure), the sterilisation is advantageously suspended and then recommenced and completed during the extraction of the stretching rod from the receptacle.

Further, as the sterilisation is limited to the zone of the moulds, the need to realise a sterile blower is no longer necessary.

Further, the use of radiations enables costs related to chemical agents and removal of residues to be reduced.

Also, the sole use of radiations makes it possible to superpose the sterilisation with the blowing, which is performed in very short times (less than two seconds).

Further, the proposed device is extremely versatile as it uses directly ionising radiations in cases in which the velocity of sterilisation of the parison walls is a priority, or indirectly ionising radiations in cases where the depth of penetration is a priority over the velocity.

Further, the ozone generated during the sterilising process with electrons can easily be evacuated by exploiting the pressurised air required for the blowing.

The invention claimed is:

1. Device (10) for blowing a receptacle (2) obtained from a parison (3) of plastic material, comprising:
   a mould (5) for the parison (3), able to assume at least one operative configuration in which it surrounds and engages said parison (3);
   a stretching rod (8) progressively insertable into the parison (3) in order to stretch it, said stretching rod (8) having a nozzle (11) at a first end (8a) turned to the parison (3),
   characterised in that it comprises at least one radiation generator (12) suitable for emitting radiation into the stretching rod (8) so that, with the mould (5) in the operative configuration, said radiation comes out from the nozzle (11) and strikes the inner walls of the parison (3) to sterilise them,
   further comprising shielding means for the radiation emitted by said generator (12), said shielding means including a shielding element (14) integral with said stretching rod (8) in such a way as to be movable with the stretching rod (8).

2. Device (10) according to claim 1, said shielding means including at least a further shielding element (13) integral with said mould (5).

3. Device (10) according to claim 1, wherein said nozzle (11) comprises a punched dome (11a).

4. Device (10) according to claim 1, wherein said radiation generator (12) is an emitter of directly ionising, or indirectly ionising, or non-ionising radiation.

5. Machine (1) for moulding receptacles (2) from parisons (3) of plastic material, comprising a plurality of moulding stations (4),
   characterised in that each moulding station (4) has associated with it a moulding device (10) according to claim 1.

6. Device (10) according to claim 2, wherein said nozzle (11) comprises a punched dome (11a).

7. Device (10) according to claim 2, wherein said radiation generator (12) is an emitter of directly ionising, or indirectly ionising, or non-ionising radiation.

8. Device (10) according to claim 3, wherein said radiation generator (12) is an emitter of directly ionising, or indirectly ionising, or non-ionising radiation.

9. Device (10) according to claim 6, wherein said radiation generator (12) is an emitter of directly ionising, or indirectly ionising, or non-ionising radiation.

* * * * *